W. C. STEPHENS.
AUTOMATIC GUIDING DEVICE.
APPLICATION FILED DEC. 26, 1911.
1,041,366.
Patented Oct. 15, 1912.
3 SHEETS—SHEET 1.
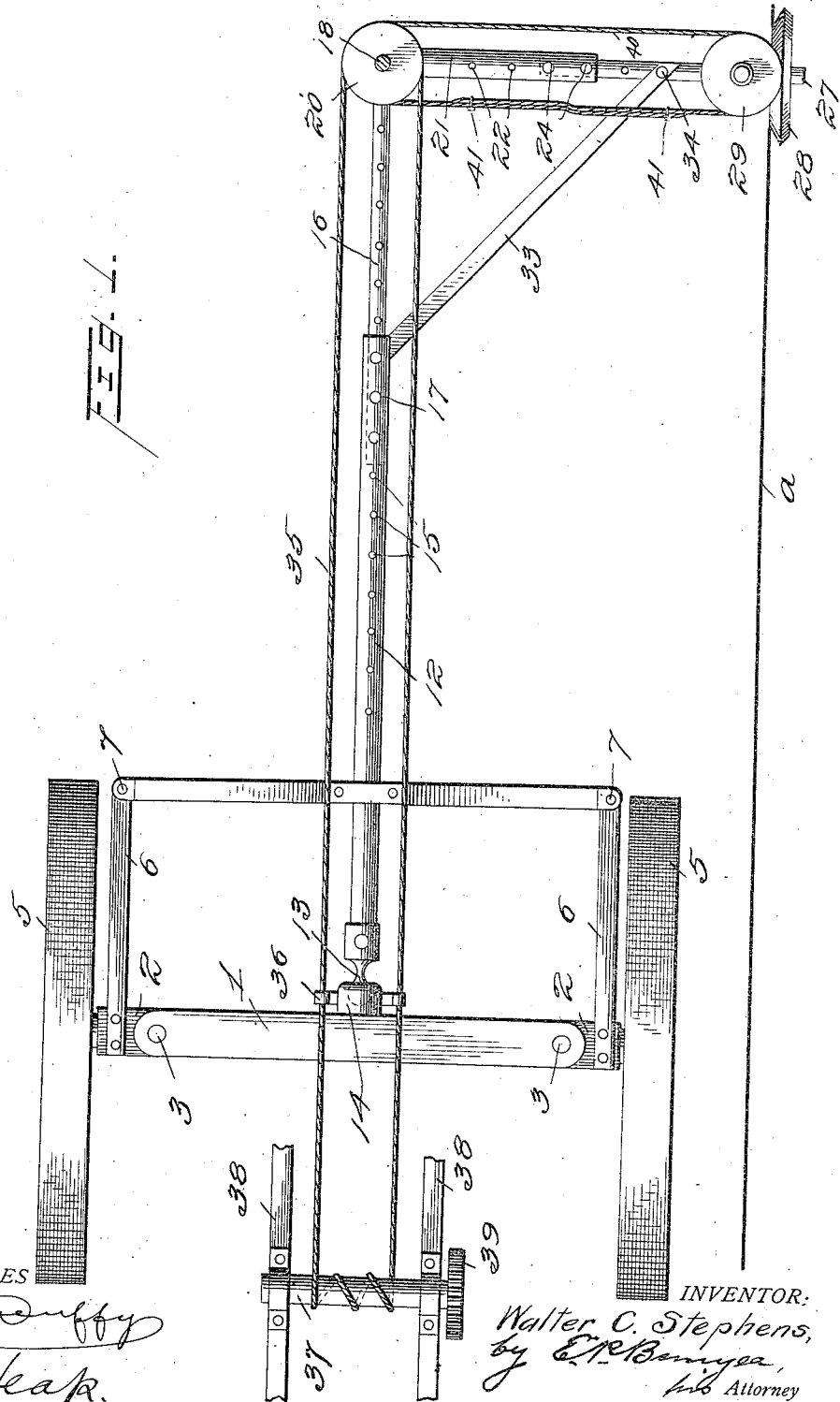
WITNESSES
INVENTOR:
Walter C. Stephens,
his Attorney

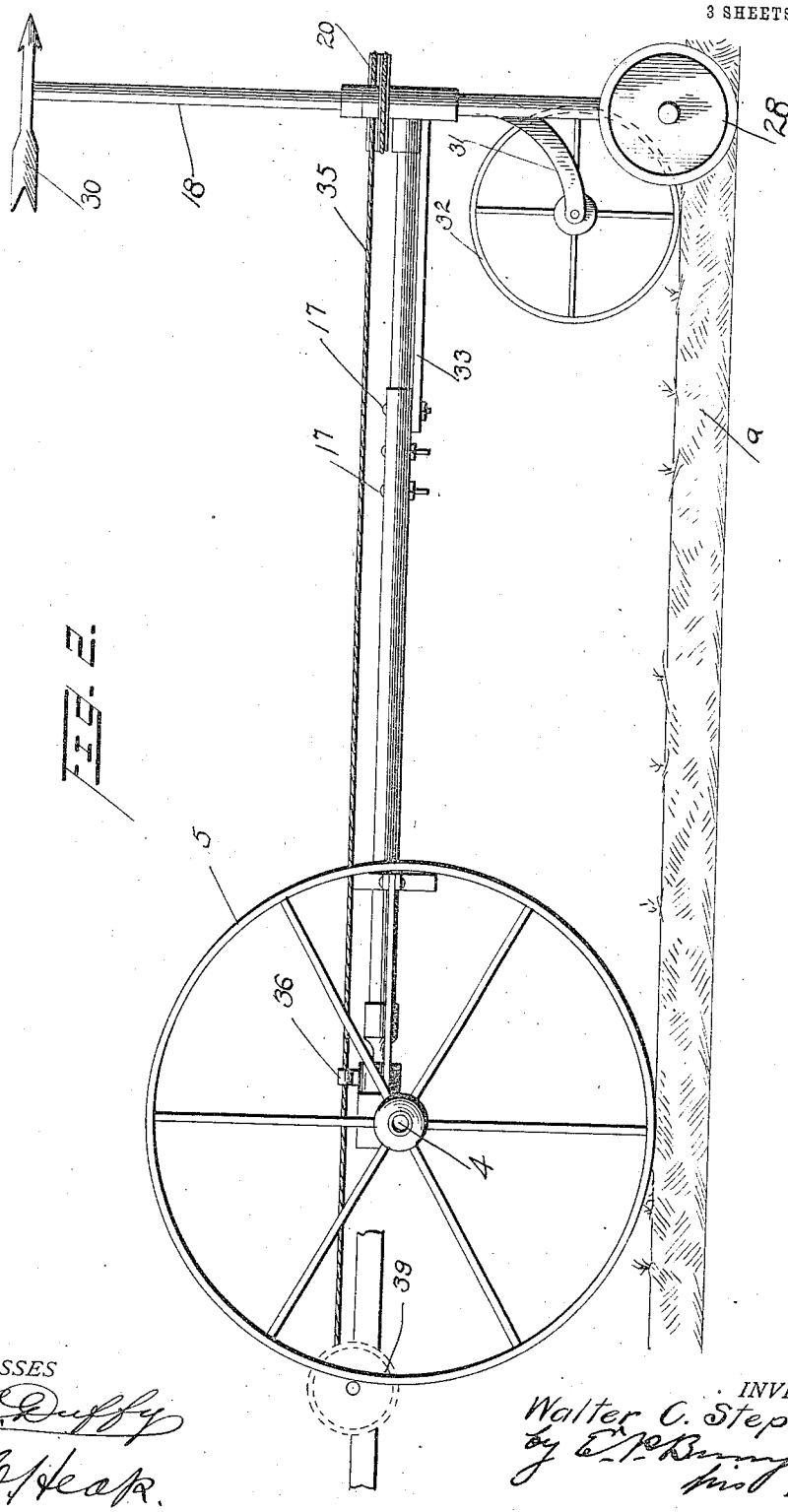

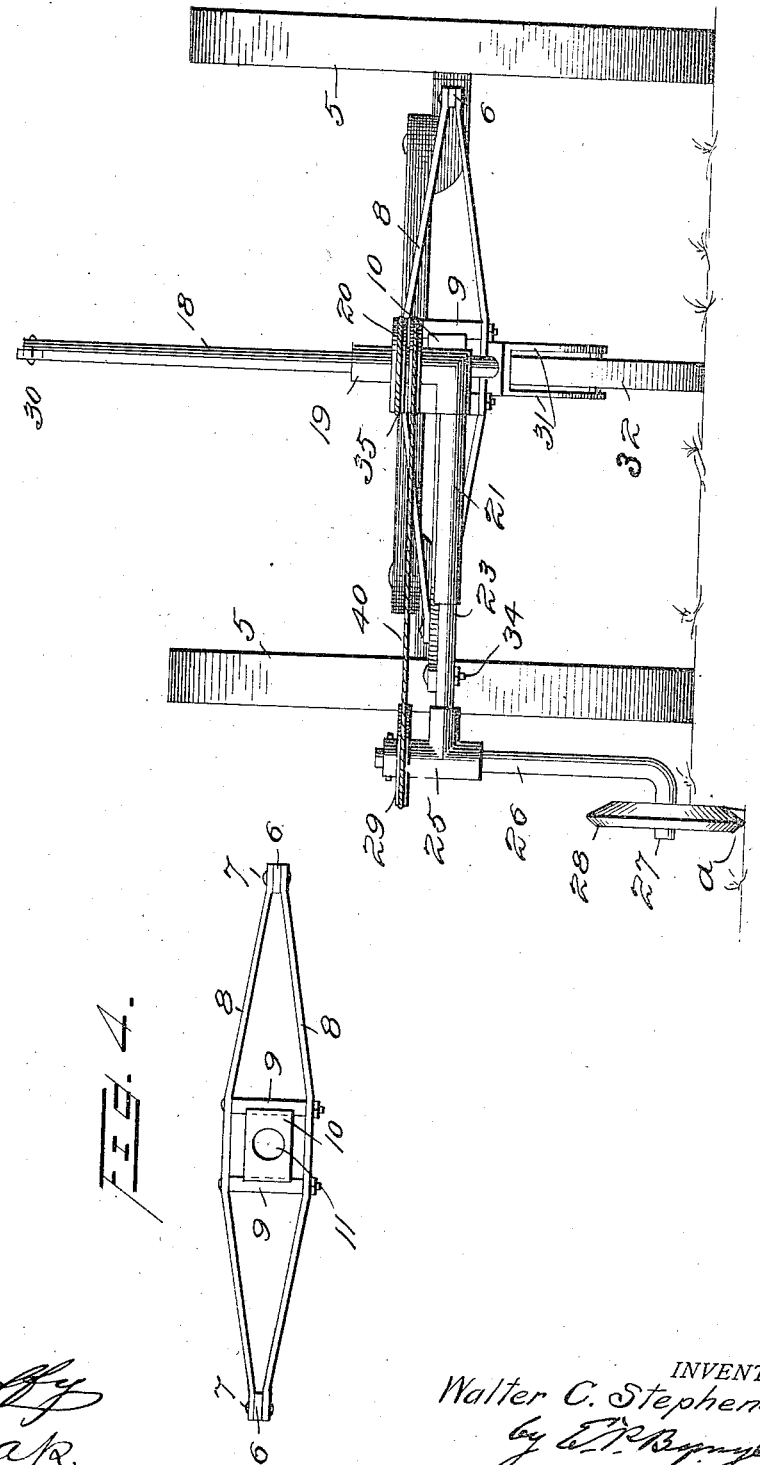

BEST AVAILABLE COPY

UNITED STATES PATENT OFFICE.

WALTER C. STEPHENS, OF APLIN, NORTH DAKOTA, ASSIGNOR TO MARIAH R. STEPHENS, OF APLIN, NORTH DAKOTA.

AUTOMATIC GUIDING DEVICE.

1,041,366.  Specification of Letters Patent.  Patented Oct. 15, 1912.

Application filed December 26, 1911. Serial No. 667,820.

*To all whom it may concern:*

Be it known that I, WALTER C. STEPHENS, a citizen of the United States of America, residing at Aplin, in the county of Oliver and State of North Dakota, have invented certain new and useful Improvements in Automatic Guiding Devices, of which the following is a specification.

This invention relates to automatic guiding devices for traction engines, and is designed to be used with gang plows or other power agricultural implements for the purpose of guiding the implement to form furrows of equal distances apart.

Another object of the invention is to provide an automatic steering device for agricultural implements which will hold the implement at the required distance from the furrow last formed and which will prevent the implement from running off toward the land-side or toward the unplowed ground.

These and other objects may be attained by means of the construction illustrated in the accompanying drawings, in which:

Figure 1 is a top plan view of a steering mechanism made in accordance with my invention; Fig. 2 is a side elevation of the same; Fig. 3 is a front end elevation; and Fig. 4 is a detail plan view of a guiding device.

Referring to the drawings, the numeral 1 designates an axle and 2 are short stub members pivoted at 3 to the axle and provided with projecting wheel spindles 4 on which the ground wheels 5 are mounted. Rigidly connected to the stub members 2 are forwardly extending bars 6 and pivoted at 7 to the front ends of the bars 6 is a guiding device comprising upper and lower bars 8 spaced apart by bolts 9 in the center. A sliding guide block 10 is mounted between the bolts 9 and is provided with a central aperture 11. The outer ends of the guiding device are brought together upon opposite sides of the bar 6, as shown more clearly in Fig. 4. A telescopic guiding member 12 is provided at its rear end with a ball member 13 seated in a socket 14 carried by the axle 1. The member 12 extends through the aperture 11 in the sliding block 10 and is provided at its front end with a series of perforations 15 for the adjustment of the telescopic member 16, said member being secured in place by means of suitable pins or bolts 17. A centrally disposed vertical rod 18 is seated in an elbow 19 and secured to said elbow is a double grooved pulley 20. Secured in the elbow 19 is a tubular member 21 provided with a series of perforations 22 for permitting the adjustment of the telescopic rod 23, said rod 23 being held in adjusted position by bolts or pins 24. Mounted on the outer end of the telescopic rod 23 is a three-way connection 25, said connection having mounted vertically therein a guide wheel support 26 having its lower end 27 bent outwardly to form a journal or bearing for the guiding disk or wheel 28. Mounted on the connection 25 is a grooved pulley 29. Connected to the upper end of the vertical rod 18 is an arrow 30 which always points in the direction of travel of the implement. Mounted in a pivoted fork 31 is a pilot wheel 32. A diagonal brace bar 33 is adjustably connected at one end to the member 12 by means of one of the bolts 17 while the opposite end of said bar is connected to the telescopic member 23 by means of a bolt or pin 34.

A wire rope or cable 35 extends around the pulley 20 and backwardly through guide eyes 36 connected to the axle 1. The rear ends of the cable 35 extend around an axle 37 mounted in the frame 38 of the implement, one stretch of said cable 35 passing over the axle 37 and the other stretch passing underneath the same, as shown more clearly in Fig. 1. A cable 40 extends around the double pulley 20 and around the grooved pulley 29 on the support 26. The cable 40 is adjustable by means of suitable staples 41. The shaft 37 is provided with a pinion or gear wheel 39 which is in operative connection with the implement.

The operation of my invention may be briefly described as follows: The guiding disk 28 bears against the landside of the furrow *a* previously made by the machine and has a tendency to hold the machine directly in parallel line with the previously formed furrow. When the disk 28 is moved transversely in either direction, it moves the wheels 5 so that the machine will always remain constantly in parallelism with the land-side line or furrow *a*. Any up and down movement of the guiding device is transmitted by the slide 10 and any slight lateral movement is permitted by the ball and socket joint at the rear end of the member 12.

My present invention is of simple construction, will insure a uniform draft line for the implement and will operate smoothly under various conditions.

I claim:

1. An automatic guiding device for agricultural implements comprising an axle, stub members pivoted to said axle, ground wheels mounted on said stub members, bars connected to said stub members, a transverse guiding device pivoted to said bars and provided with a sliding block, a telescopic guiding member extending through said sliding block and pivoted to the axle, a member adjustably connected to said telescopic member, a laterally extending telescopic member, a guide disk support having a guide disk mounted thereon, pulleys, and cables extending around said pulleys, one of said cables passing around an axle mounted on the implement.

2. An automatic guiding device for agricultural implements comprising an axle, stub shafts pivoted to said axle, bars secured to said stub shafts, a guiding device pivoted to said bars and provided with a centrally disposed sliding block, a telescopic guiding device extending through said block and mounted in a ball and socket joint on the axle, a grooved pulley at the front of said telescopic guiding device, a laterally extending telescopic support, a guide wheel, a grooved pulley, a cable extending around said grooved pulley, and a cable extending around one of said pulleys back to an axle on the implement.

In testimony whereof I affix my signature in presence of two witnesses.

WALTER C. STEPHENS.

Witnesses:
  CHAS. WAECHTER,
  H. L. STEPHENS.